(12) United States Patent
Kimura (10) Patent No.: US 10,866,111 B2
(45) Date of Patent: Dec. 15, 2020

(54) IN-VEHICLE SYSTEM (71) Applicant: ALPINE ELECTRONICS, INC., Tokyo (JP)

(72) Inventor: Tsuyoshi Kimura, Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 252 days.

(21) Appl. No.: 16/215,984

(22) Filed: Dec. 11, 2018

(65) Prior Publication Data

US 2019/0204104 A1 Jul. 4, 2019

(30) Foreign Application Priority Data

Dec. 28, 2017 (JP) ................................. 2017-254596

(51) Int. Cl.
*G01C 21/36* (2006.01)
*G02B 27/01* (2006.01)
(Continued)

(52) U.S. Cl.
CPC ............ *G01C 21/365* (2013.01); *B60K 35/00* (2013.01); *G01C 21/3679* (2013.01);
(Continued)

(58) Field of Classification Search
CPC ........ G01C 21/00; G01C 21/34; G01C 21/36; G01C 21/365; G01C 21/3679;
(Continued)

(56) References Cited

U.S. PATENT DOCUMENTS 10,449,971 B2 * 10/2019 Arakawa ......... B60W 30/18163
10,549,762 B2 * 2/2020 Naserian ............... B60W 10/18
(Continued)

FOREIGN PATENT DOCUMENTS

JP 2010-66042 3/2010
JP 2015-105903 6/2015
(Continued)

OTHER PUBLICATIONS

Extended European Search Report dated May 29, 2019 in corresponding European Application No. 18214734.8.

*Primary Examiner* — Yonel Beaulieu
(74) *Attorney, Agent, or Firm* — Brinks Gilson & Lione (57) ABSTRACT

A position in a left-right direction of a display position of a facility figure representing a facility is set to a position overlapping with a virtual line parallel to a traveling lane as viewed from a driver (c). A position in an up-down direction of the display position is determined to be a position overlapping with a road surface on the front side, the position separated upward by H1 from a lower end of a display area of a heads-up display when a distance L from a current position CP to a position TP of a facility is a distance ThL (b1), to be a position separated by H4 (H4<h1) when the distance L is zero, and such that distances H2 and H3 separated upward from the lower end of the display area gradually change from the distance H1 to the distance H4 as the distance L decreases from the distance ThL to zero (b2 and b3). The distance H1 is set such that the facility figure is displayed below a point facing the facility on the road surface on the front side when the distance L is the distance ThL.

11 Claims, 7 Drawing Sheets

(51) Int. Cl.
*G02B 27/00* (2006.01)
*G01C 21/00* (2006.01)
*B60K 37/00* (2006.01)
*B60K 35/00* (2006.01)
*G06T 7/00* (2017.01)
*G06T 7/11* (2017.01)
*G06T 7/20* (2017.01)

(52) U.S. Cl.
CPC ..... *G02B 27/0103* (2013.01); *G02B 27/0179* (2013.01); *B60K 2370/155* (2019.05); *B60K 2370/1529* (2019.05); *B60K 2370/1531* (2019.05); *B60K 2370/177* (2019.05); *B60K 2370/29* (2019.05); *B60K 2370/334* (2019.05); *G02B 2027/014* (2013.01); *G02B 2027/0185* (2013.01)

(58) Field of Classification Search
CPC .... B60K 35/00; B60K 37/00; B60K 2370/00; B60K 2370/152; B60K 2370/1529; B60K 2370/1531; B60K 2370/179; B60K 2370/18; G02B 27/00; G02B 27/01; G02B 27/0101; G02B 27/0103; G02B 27/017; G02B 27/0179; G02B 27/0185; G02B 27/0198; G06T 7/00; G06T 7/11; G06T 7/20

See application file for complete search history.

(56) References Cited

U.S. PATENT DOCUMENTS

| | | | |
|---|---|---|---|
| 10,676,087 B2* | 6/2020 | Nishiguchi | B60W 50/10 |
| 2018/0354517 A1* | 12/2018 | Banno | B60W 50/14 |
| 2020/0010095 A1* | 1/2020 | Kim | B60W 30/02 |
| 2020/0012873 A1* | 1/2020 | Kim | G06K 9/00825 |
| 2020/0238907 A1* | 7/2020 | Watanabe | H04N 7/188 |

FOREIGN PATENT DOCUMENTS

| | | |
|---|---|---|
| JP | 2015-172548 | 10/2015 |
| JP | 2016-212022 | 12/2016 |
| WO | 2014/112054 | 7/2014 |

\* cited by examiner

FIG. 7D

IN-VEHICLE SYSTEM

RELATED APPLICATIONS

The present application claims priority to Japanese Patent Appln. No. 2017-254596, filed Dec. 28, 2017, the entire disclosure of which is hereby incorporated by reference.

BACKGROUND

1. Field of the Disclosure

The present disclosure relates to a technique for presenting a position of a facility using a heads-up display provided in an automobile.

2. Description of the Related Art

There are known techniques for presenting a position of a facility using a heads-up display provided in an automobile. In one known technique, a mark representing a facility is displayed at a position overlapping the facility as viewed from a driver using a heads-up display (for example, JP 2015-105903 A). In another technique, a mark representing a facility is displayed in a form of a balloon from the facility at a position overlapping the sky as viewed from a driver using a heads-up display (for example, JP 2016-212022 A).

According to the techniques for displaying the mark representing the facility at the position overlapping with the facility or the sky as viewed from the driver using the heads-up display described above, it is generally necessary for the driver to greatly move the line of sight directed to a road on the front side to a position where the mark is displayed in order to properly confirm the mark so that the visibility is not necessarily good.

Therefore, the amount of movement of the line of sight of the driver is reduced by displaying the mark at a position overlapping with a point on a road that the facility faces as viewed from the driver so as to enable visual recognition of the mark existing at the point, but in this case, the following problems arise.

In above-described systems, the mark can be displayed only after the facility is included in the field of view. Moreover, it is necessary to display the mark, which is caused to be viewable as if existing at a farther point, in a smaller size in order to prevent unnatural display. Accordingly, a period during which the mark can be displayed with a size that is well viewable to a user is shortened when an automobile is traveling at a high rate of speed, and it is difficult to secure good visibility of the mark. In addition, when an area where display using the heads-up display can be performed is narrow, there arises a problem that a mark of a facility is displayed for a limited time before an automobile passes a facility.

Therefore, an object of the present disclosure is to display a mark representing a facility using a heads-up display to be better viewable.

SUMMARY

To address the above objectives, the present disclosure relates to an in-vehicle system, which displays a facility figure that is a figure representing a facility using a heads-up display projecting an image such that a virtual image is displayed a front side of a front windshield of an automobile with respect to a user aboard the automobile. The in-vehicle system may include memory and a processor in communication with the memory. The processor is configured to execute instructions stored in the memory and to control the display of the facility figure representing the facility using the heads-up display from a target facility distance, which is a distance from the automobile to the facility for which the facility figure is displayed positioned on a front side in a progressing direction of the automobile of a road on which the automobile is traveling becomes equal to or less than a first predetermined distance, until the target facility distance becomes a second predetermined distance smaller than the first predetermined distance. Here, the display control unit uses, as a display area, an area in up-down and left-right directions, which overlaps with an area that allows the heads-up display to display the virtual image as viewed from the user to set a display position of a facility figure using the heads-up display such that the facility figure moves along a road on a road surface of the road on which the automobile is traveling as viewed from the user while a position in the display area overlapping with the facility figure as viewed from the user is changed from a position at which a height in the display area becomes a predetermined first height to a position at which the height becomes a predetermined second height, lower than the first height, as the target facility distance changes from the first predetermined distance to the second predetermined distance, and causes the heads-up display to display a facility indicating figure, which is a figure extending from the facility figure to the facility as viewed from the user during a period in which the facility figure is displayed. However, when the target facility distance is the first predetermined distance, the first height is lower than a height of a position in the display area overlapping with a point facing the facility on the traveling road as viewed from the user In some implementations, the in-vehicle system may be configured such that the processor is configured to set the display position of the facility figure using the heads-up display to a position overlapping with a virtual line as viewed from the user when the virtual line parallel to a lane on which the automobile is traveling is present on the road surface of the traveling road regarding a position in the left-right direction, and sets the display position of the facility figure using the heads-up display such that the position in the display area overlapping with the facility figure as viewed from the user becomes a position at the first height when the target facility distance is the first predetermined distance, becomes a position at the second height when the target facility distance is the second predetermined distance, and gradually changes from the position at the first height to the position at the second height as the target facility distance decreases from the first predetermined distance to the second predetermined distance regarding a position in the up-down direction.

Further, in some implementations, the virtual line corresponds to either a virtual line that is parallel to a lane on which the automobile is traveling and passes through an inside of the lane or a virtual line that is parallel to the lane on which the automobile is traveling and passes through an outside of the lane in this case.

In implementations of the in-vehicle system as described above, the facility figure is displayed to be viewable at a position on a near side of the position of the facility when the distance to the facility is far, and thus, the display is not unnatural even if the facility figure is displayed in a size larger than a size in the case of displaying the facility figure at the position of the facility, and further, it is possible to display the facility figure even before the facility is included in the field of view. Accordingly, it is possible to prolong a period during which the facility figure can be displayed with a size that is well viewable to the user.

Further, the facility figure is viewable to move to a position nearer to the front as approaching the facility, and thus, the user can intuitively grasp the approach to the facility through the display of the facility figure.

Here, implementations of the above in-vehicle system may be configured such that the processor is configured to set a display size of a facility figure using the heads-up display to increase as a distance between a facility for which the facility figure is displayed and the automobile changes from the first predetermined distance to the second predetermined distance.

As the display size of the facility figure is set in this manner, the user can more intuitively grasp the approach to the facility represented by the facility figure.

Further, in order to address the above objectives, the present disclosure relates to an in-vehicle system, which displays a facility figure that is a figure representing a facility using a heads-up display projecting an image such that a virtual image is displayed on a front side of a front windshield of an automobile with respect to a user aboard the automobile. The in-vehicle system may include memory and a processor in communication with the memory. The processor is configured to execute instructions stored in the memory and to control the display of the facility figure representing the facility using the heads-up display since a target facility distance, which is a distance from the automobile to the facility for which the facility figure is displayed positioned on a front side in a progressing direction of the automobile of a road on which the automobile is traveling becomes equal to or less than a first predetermined distance until the target facility distance becomes a second predetermined distance smaller than the first predetermined distance. The processor is configured to use, as a display area, an area in up-down and left-right directions, which overlaps with an area that allows the heads-up display to display the virtual image as viewed from the user to set a display position of a facility figure using the heads-up display such that the facility figure is at a position overlapping with a position on a road surface of the road on which the automobile is traveling as viewed from the user and a position in the display area overlapping with the facility figure as viewed from the user has a height in the display area being a predetermined height, and to cause the heads-up display to display a facility indicating figure, which is a figure extending from the facility figure to the facility as viewed from the user during a period in which the facility figure is displayed. However, the position in the display area that has the height in the display area being the predetermined height is a position below a point facing the facility on the road surface of the traveling road as viewed from the user when the target facility distance is the first predetermined distance.

In some implementations of an in-vehicle system, the facility figure is displayed to be viewable at a position on the near side the position of the facility when the distance to the facility is far, and thus, the display is not unnatural even if the facility figure is displayed in a size larger than a size in the case of displaying the facility figure at the position of the facility, and further, it is possible to display the facility figure even before the facility is included in the field of view. Accordingly, it is possible to prolong a period during which the facility figure can be displayed with a size that is well viewable to the user.

Here, in implementations of the in-vehicle systems described above, the second predetermined distance is preferably a distance from the automobile to the facility when the automobile reaches the facility.

In implementations of the above in-vehicle system, the display position of the facility figure when the target facility distance becomes the second predetermined distance is set to be within the display area irrespective of the distance set as the second predetermined distance, and thus, the display position of the facility figure is not displayed at the outside of the display area until reaching the facility, and it is possible to continuously keep displaying the facility figure without any hindrance.

In addition, in implementations of the above in-vehicle system, the facility figure may be a figure representing a state where a mark representing a type of the facility is supported in an upright state by a pole erected on a base, and the facility indicating figure may be a figure extending from a portion representing the base of the facility figure toward the facility as viewed from the user.

Further, in implementations of the above in-vehicle system, the facility figure may be a figure representing an inclination state of a mark representing a type of the facility.

As described above, it is possible to display the mark representing the facility to be viewable better using the heads-up display according to the present invention.

DETAILED DESCRIPTION OF THE DRAWINGS

Figure 1:
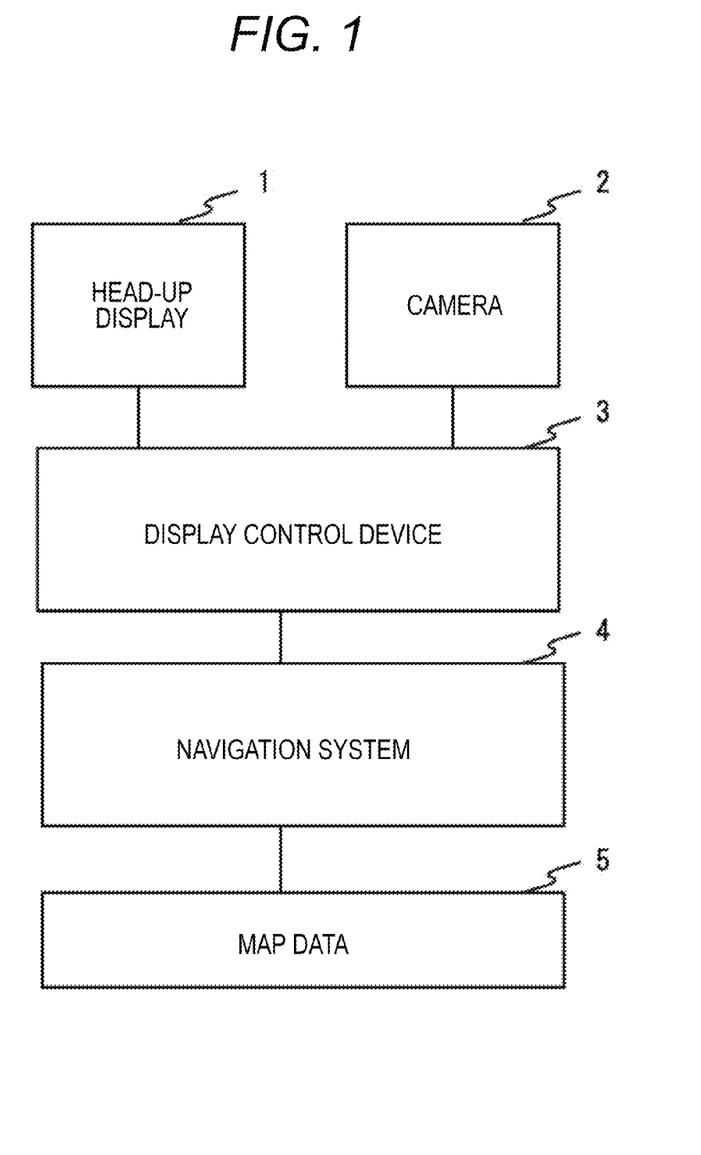
FIG. 1 is a block diagram illustrating one implementation of a configuration of an in-vehicle system.

FIG. 1 illustrates one implementation of a configuration of an in-vehicle system.

The in-vehicle system is a system installed in an automobile and may include: a heads-up display 1; a camera 2 that captures the front side of the automobile; a display control device 3 that controls display of the heads-up display 1; a navigation system 4 that performs calculation of a current position and route guidance to a destination; and map data 5 as illustrated in the drawing. In some implementations the control device 3 and/or the navigation system 4 may include a microcontroller, central processing unit (CPU), or any other type of hardware processor that is able to read and execute instructions stored in memory.

Here, the map data 5 includes road data representing a road network, facility data representing a position and a type of each facility, and the like.

Figure 2A:
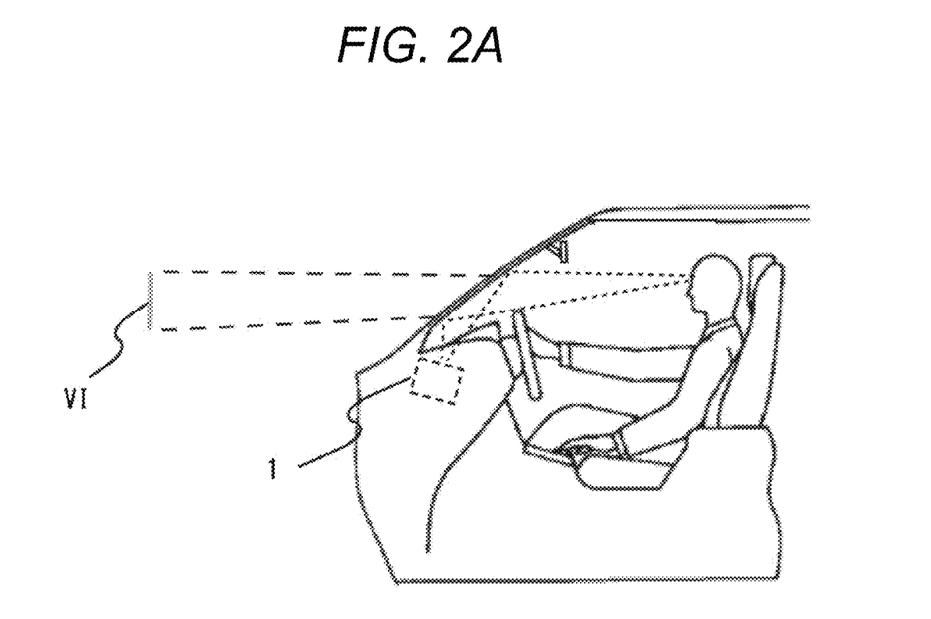
FIGS. 2A and 2B are views illustrating an arrangement and a display area of a heads-up display.
Figure 2B:
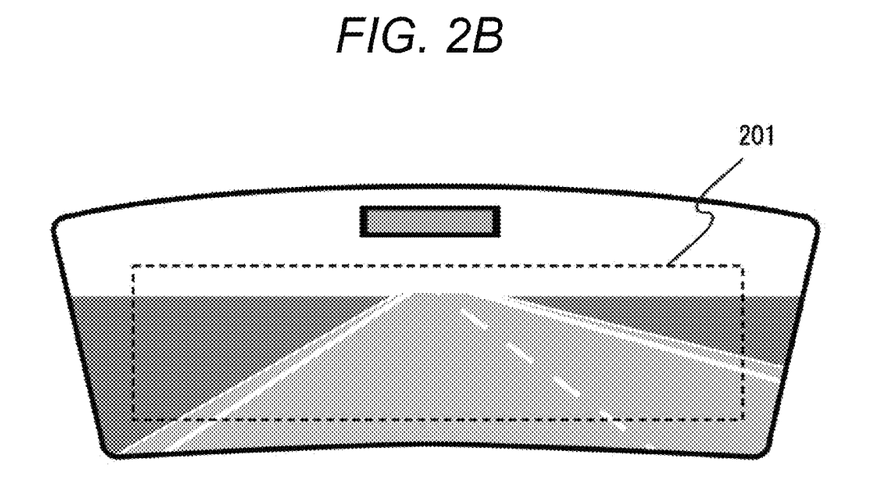

Next, as illustrated in FIG. 2A, the heads-up display 1 can display a virtual image VI within an area overlapping a display area 201 illustrated in FIG. 2B as viewed from a driver on the front side of the automobile by projecting an image from the lower side to a front windshield in front of a driver's seat.

In such a configuration, a facility serving as a target of facility figure display is set in the navigation system 4. Here, this setting is performed by, for example, receiving selection of a specific type of a facility from a user, setting each facility of the type for which the selection is received as the facility serving as the target of the facility figure display, and the like.

Further, the navigation system 4 repeatedly performs a process of instructing the display control device 3 to execute a facility figure display process of using the calculated current position and a facility position indicated by the facility data stored in the map data 5 to calculate a distance along a traveling road between the facility serving as the target of the facility figure display, which is the facility facing the traveling road on the front side in a progressing direction, and the current position, and setting a facility whose distance from a current position is equal to or smaller than a threshold distance ThL as a target facility if there is the facility whose distance from the current position is equal to or smaller than the predetermined threshold distance ThL.

Then, the display control device 3 having received the instruction executes the facility figure display process for the target facility.

Figure 3:
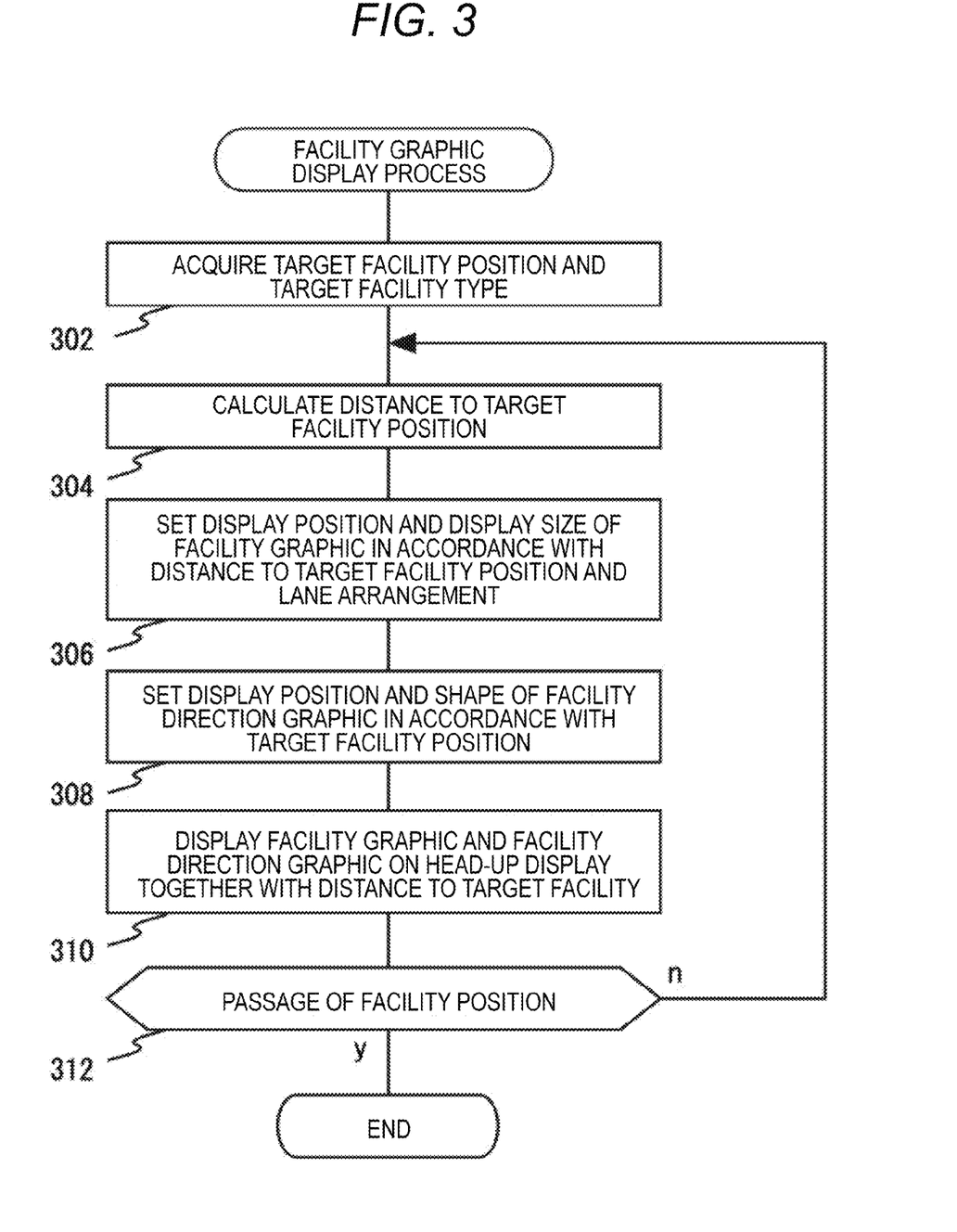
FIG. 3 is a flowchart illustrating a facility figure display process.

FIG. 3 illustrates a procedure of this facility figure display process.

As illustrated in the drawing, the display control device 3 first acquires a position and a type of the target facility from the map data 5 in the facility figure display process (Step 302).

Then, the distance along the traveling road from the current position calculated by the navigation system 4 to the position of the target facility is calculated (Step 304).

Further, a display position and a display size of a facility figure are set in accordance with the distance along the traveling road from the calculated current position to the target facility position and an arrangement of lanes on the front side in the progressing direction of the traveling road (Step 306).

Here, the arrangement of the lanes can be obtained, for example, by recognizing a white line included in an image on the front side of the automobile captured by the camera 2. However, the arrangement of the lanes may be calculated based on the number of lanes and a lane width included in the map data, and the current position, or the arrangement of the lanes may be calculated using lines along a road that pass through positions distant by a predetermined distance from right and left of the automobile as right and left boundaries of the lane.

Further, the display position and the display size of the facility figure are set as follows.

Figure 4:
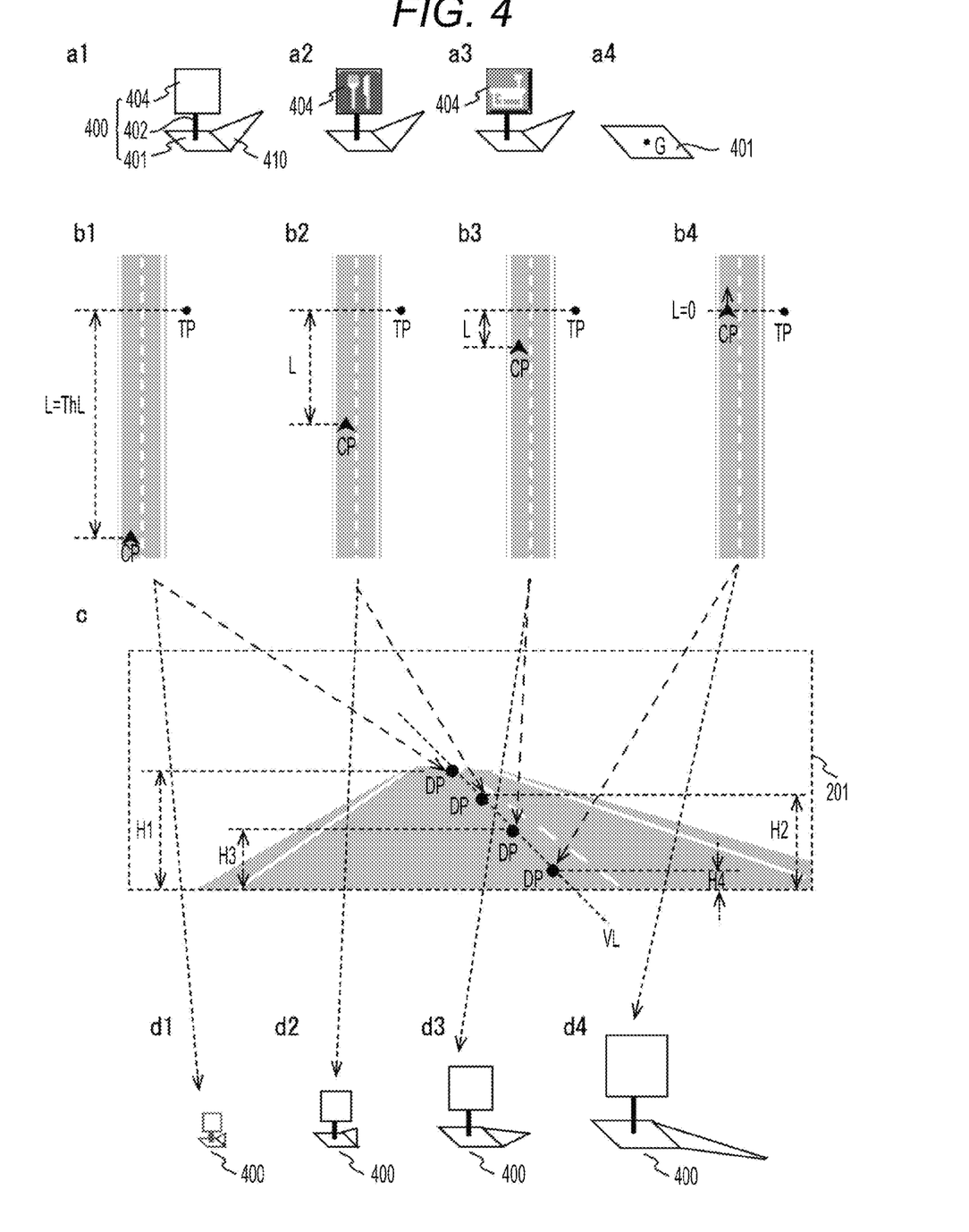
FIG. 4 is a view illustrating a method of setting an arrangement and a size of a facility figure.

First, as illustrated in FIG. 4a1, a figure formed of a base FIG. 401 imitating a base of a stunt signboard, a pole FIG. 402 imitating a pole erected from the base of the stunt signboard, and a mark 404 imitating a signboard part supported by the pole of the stunt signboard is used as a facility FIG. 400 in the present embodiment. Further, a facility direction indicating FIG. 410 is added to the facility FIG. 400.

However, a shape of the facility direction indicating FIG. 410 is variable as will be described later.

Further, a mark indicating a type of a facility represented by the facility FIG. 400 is used as the mark 404 as illustrated in FIGS. 4a2 and 4a3. The mark indicating the type of the facility also includes a brand mark of the facility.

Further, the display position of the facility FIG. 400 is set by determining a display position DP, which is a position in the display area 201 overlapping with a center position G of the base FIG. 401 illustrated in FIG. 4a4 as viewed from the driver as follows.

That is, as illustrated in FIG. 4c, if the target facility is positioned on the right side of the traveling road, a position in the left-right direction of the display position DP of the center position G of the base FIG. 401 is set to a position overlapping with a virtual line VL as viewed from the driver when the virtual line VL which is on the left side separated, by a predetermined distance, from a white line (or boundary) on the right side of the traveling lane of the traveling road actually exists. Similarly, if the target facility is positioned on the left side of the traveling road, the position in the left-right direction of the display position DP of the center position G of the base FIG. 401 is set to a position overlapping with a virtual line as viewed from the driver when the virtual line which is on the right side separated, by a predetermined distance, from a white line (or boundary) on the left side of the traveling lane of the traveling road actually exists.

Further, as illustrated in FIG. 4c, a position in the up-down direction of the display position DP of the center position G of the base FIG. 401 is determined to be a position separated upward, by a distance H1, from a lower end of the display area 201 of the heads-up display 1 when a distance L along the traveling road from a current position CP to a position TP of the target facility is the above-described threshold distance ThL as illustrated in FIG. 4b1, and to be a position separated upward, by a distance H4 (H4<h1), from the lower end of the display area 201 of the heads-up display 1 when the distance L along the traveling road from the current position CP to the position TP of the target facility is zero as illustrated in FIG. 4b4.

Further, the position in the up-down direction of the display position DP of the center position G of the base FIG. 401 is determined such that distances H2 and H3 separated upward from the lower end of the display area 201 of the heads-up display 1 gradually decrease from the distance H1 to the distance H4 as the distance L along the traveling road from the current position CP to the position TP of the target facility decreases from the threshold distance ThL to zero as illustrated in FIGS. 4b2 and 4b3.

However, the distance H1 of the display position of the base FIG. 401 from the lower end of the display area 201 of the heads-up display 1 when the distance L along the traveling road from the current position CP to the position TP of the target facility is the above-described threshold distance ThL as illustrated in FIG. 4b1 is set such that a distance along the traveling road on a road surface of the traveling road on the front side as viewed from the user becomes a distance smaller than a distance of a position on the front windshield where a point separated by the threshold distance ThL overlaps from the lower end of the display area 201.

Further, the distance H1 is set such that the display position of the base FIG. 401 becomes a position overlapping with a relatively far position on a road surface of the traveling road on the front side as viewed from the driver, and the distance H4 is set such that the display position of the base FIG. 401 becomes a position overlapping with a relatively close position on the road surface of the traveling road on the front side as viewed from the driver.

Next, the display size of the facility FIG. 400 is determined to a relatively small size as illustrated in FIG. 4d1 when the distance L along the traveling road from the current position CP to the position TP of the target facility is the above-described threshold distance ThL as illustrated in FIG. 4*b*1, and set to a relatively large size as illustrated in FIG. 4*d*4 when the distance L along the traveling road from the current position CP to the position TP of the target facility is zero as illustrated in FIG. 4*b*4.

Further, the display size of the facility FIG. 400 is determined to gradually increase from the size of FIG. 4*d*1 to the size of FIG. 4*d*4 as illustrated in FIGS. 4*d*2 and 4*d*3 as the distance L along the traveling road from the current position CP to the position TP of the target facility decreases from the threshold distance ThL to zero as illustrated in FIGS. 4*b*2 and 4*b*3.

When the display position and display size of the facility FIG. 400 are determined as described above, the display size of the facility FIG. 400 increases and the display position thereof moves downward along the road as the distance L along the traveling road from the current position CP to the position TP of the target facility decreases.

Returning to FIG. 3, when the display position and the display size of the facility FIG. 400 have been set in this manner (Step 306), a display position and a shape of the facility direction indicating FIG. 410 are set in accordance with the display position and the display size of the facility FIG. 400 and the position of the target facility (Step 308). Here, the display position and the shape of the facility direction indicating FIG. 410 are set such that the facility direction indicating FIG. 410 extends toward a direction of the position of the target facility from the base FIG. 401 of the facility FIG. 400 for which the display position and the display size have been set as described above within a range of the display area 201 as viewed from the driver.

Further, using the heads-up display 1, the facility FIG. 400 is displayed in the display size set in Step 306 at the display position set in Step 306, and the facility direction indicating FIG. 410 with the shape set in Step 308 is displayed at the display position set in Step 308. At the same time, the distance to the target facility is displayed in the vicinity of the facility FIG. 400 using the heads-up display 1 (Step 310). If the facility FIG. 400 of the target facility, the facility direction indicating FIG. 410, and the distance are already displayed at this time, the facility FIG. 400, the facility direction indicating FIG. 410, and the distance are displayed so as to update the existing data.

Then, it is checked whether the current position has passed the position of the target facility (Step 312). The process returns to the processing from Step 304 if the current position has not passed the position of the target facility, and the facility figure display process is ended if the current position has passed the position of the target facility.

Implementations of a facility figure display process performed by the display control device 3 has been described as above.

Figure 5A:
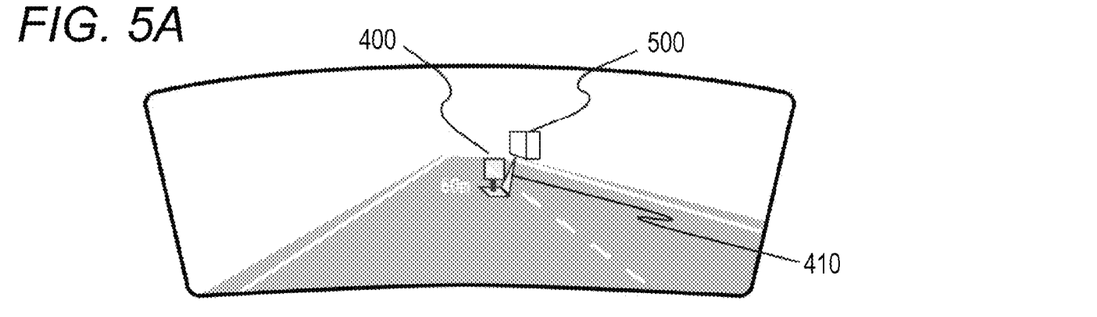
FIGS. 5A to 5D are views illustrating a display example of a facility figure.

According to such a facility figure display process, as illustrated in FIG. 5A, the facility FIG. 400 is displayed in a relatively small size at a position relatively far from the driver on the road surface of the front road when the automobile approaches the facility 500, which is a display target of the facility FIG. 400, within the threshold distance ThL. Further, the type of the facility, the position (or the direction) of the facility 500, and the distance to the facility are presented, respectively, by the mark 404 of the facility FIG. 400, the facility direction indicating FIG. 410 added to the facility FIG. 400, and the display of the distance.

Figure 5B:
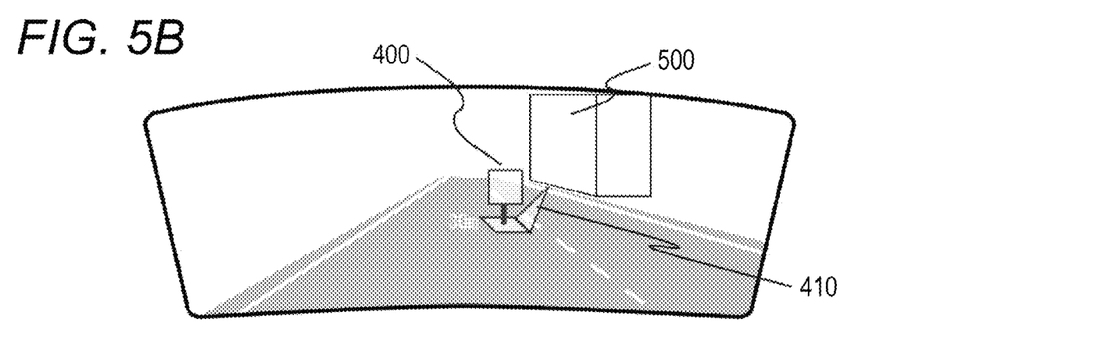
Figure 5C:
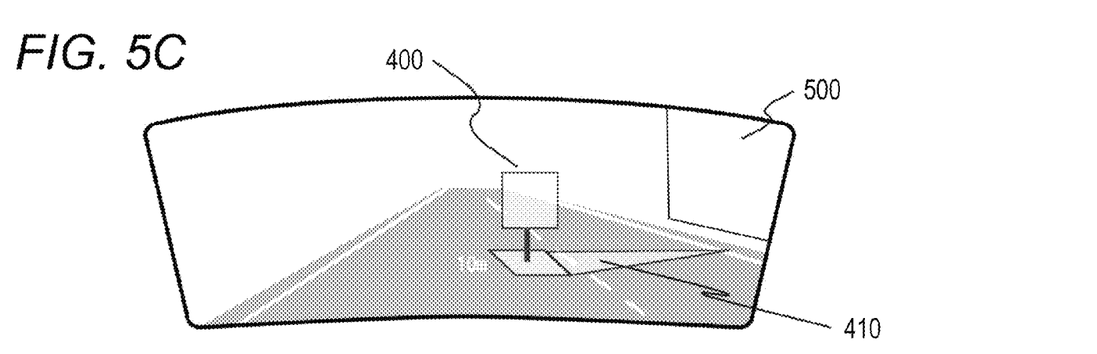

Thereafter, as the automobile progresses and approaches the facility 500 where the facility FIG. 400 is displayed, the facility FIG. 400 gradually approaches the driver along the road while gradually being large as illustrated in FIGS. 5B and 5C. Accordingly, the driver can intuitively grasp the approach of the facility 500 through the display of the facility FIG. 400. In addition, it is possible to grasp the position (or the direction) of the facility 500 based on the facility direction indicating FIG. 410 added to the facility FIG. 400 and the distance to the facility based on the display of the distance.

Figure 5D:
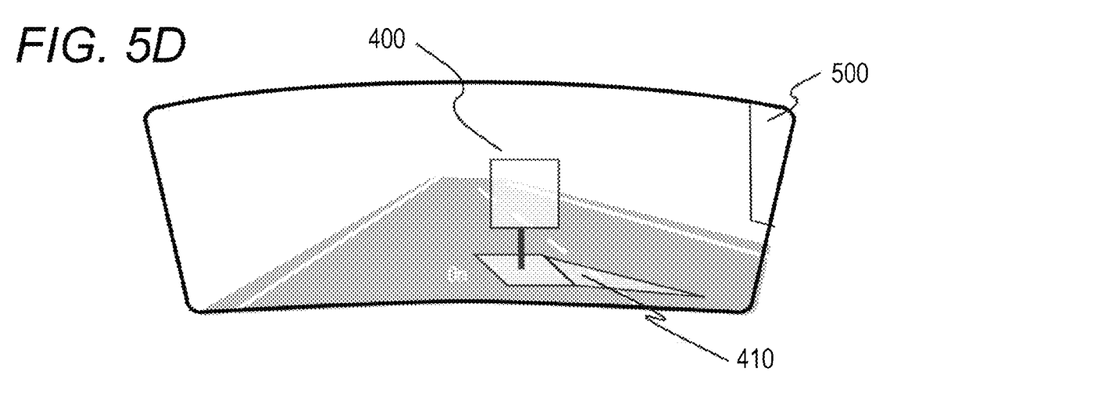

Thereafter, when the automobile reaches the position of the facility 500, the facility FIG. 400, the facility direction indicating FIG. 410, and the distance are displayed as illustrated in FIG. 5D. Here, since the facility 500 is positioned on the side of the automobile, the shape of the facility direction indicating FIG. 410 displayed when the automobile reaches the position of the facility 500 becomes a shape extending in a rearward direction of the automobile, and the direction of the facility 500 is presented using such a shape to the user.

Thereafter, when the automobile passes through the facility 500, the facility FIG. 400, the facility direction indicating FIG. 410, and the distance for the facility 500 are not displayed.

Although FIGS. 5A to 5D illustrate cases where the threshold distance ThL is set as a distance within which the facility 500 is included in the field of view of the driver over the display area 201, the threshold distance ThL may be set as a distance larger than a distance within which the facility 500 enters the field of view of the driver over the display area 201 or the field of view over the front windshield.

In this manner, it is possible to display the facility FIG. 400 of the facility 500 from the time before the facility 500 is included in the driver's field of view over the display area 201 or over the front windshield.

According to implementations of the present disclosure, the facility FIG. 400 is displayed to be viewable at a position on the near side the position of the facility when the distance to the facility is far, and thus, the display is not unnatural even if the facility FIG. 400 is displayed in a size larger than a size in the case of displaying the facility FIG. 400 at the position of the facility, and further, it is possible to display the facility FIG. 400 even before the facility is included in the field of view. Accordingly, it is possible to prolong a period during which the facility FIG. 400 can be displayed with a size that is well viewable to the user.

Further, since the display position of the facility FIG. 400 at the time of reaching the facility is set to be within the display area 201, the display position of the facility FIG. 400 is not displayed at the outside of the display area 201 until reaching the facility, and it is possible to continuously keep displaying the facility FIG. 400 without any hindrance until reaching the facility.

Further, the facility FIG. 400 is viewed as if it moves to a position closer to the front while being enlarged as approaching the facility, and thus, the user can intuitively grasp the approach to the facility through the display of the facility FIG. 400.

Meanwhile, the facility FIG. 400 and the facility direction indicating FIG. 410 in the above embodiment may use figures other than the figures illustrated above.

Figure 6A:
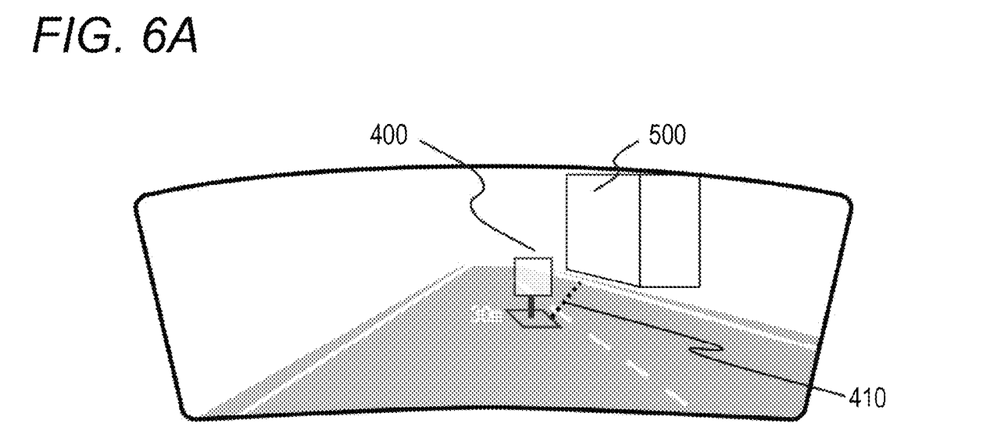
FIGS. 6A to 6C are views illustrating another display example of the facility figure.

That is, the base FIG. 401 of the facility FIG. 400 may be a figure representing only an outline, and the facility direction indicating FIG. 410 may be a dotted line extending from the base FIG. 401 toward the facility 500, for example, as illustrated in FIG. 6A.

Figure 6B:
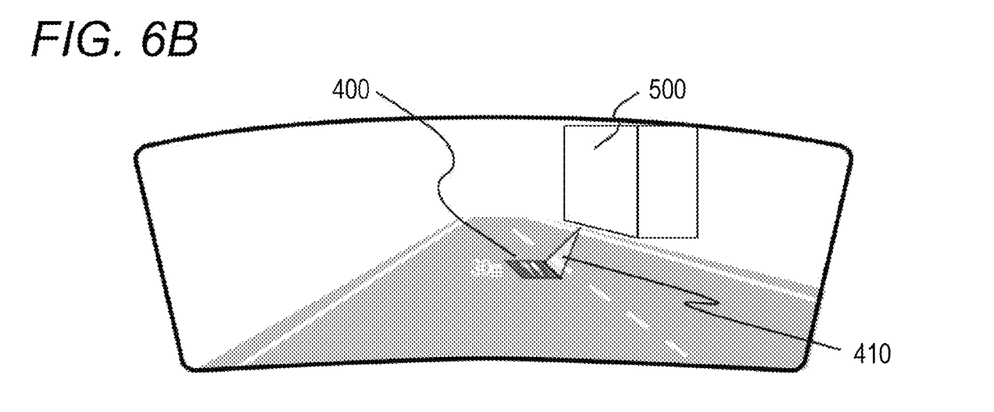

Alternatively, the facility FIG. 400 may be a figure representing a state inclined obliquely from front and above of a mark representing a type of a facility which is a quadrangle arranged to face upward, for example, as illustrated in FIG. 6B. In this case, the display position of the facility FIG. 400 (an inclined mark) is set at the same position as the display position of the base FIG. 401 in the display of the facility FIG. 400 in the above-described embodiment.

Figure 6C:
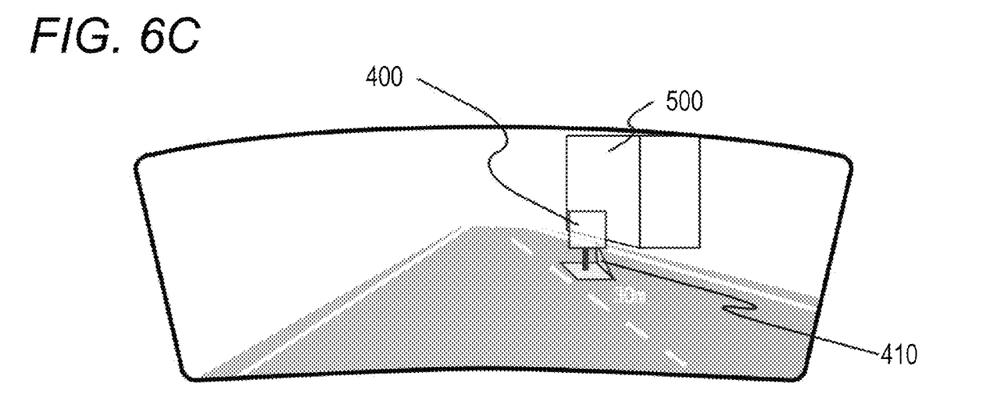
Figure 7A:
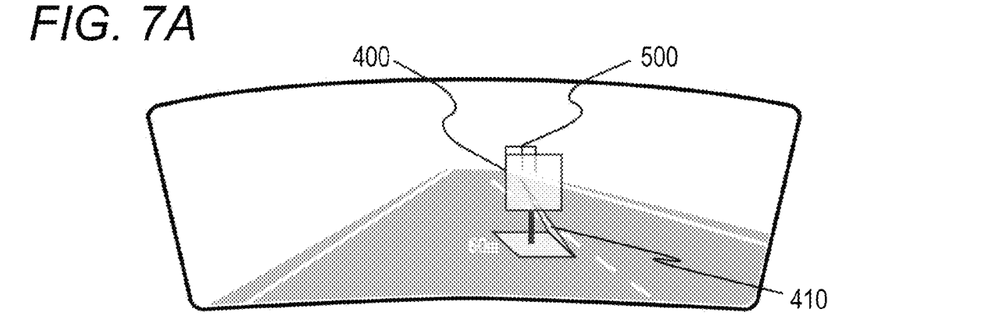
FIGS. 7A to 7D are views illustrating another display method of the facility figure.
Figure 7B:
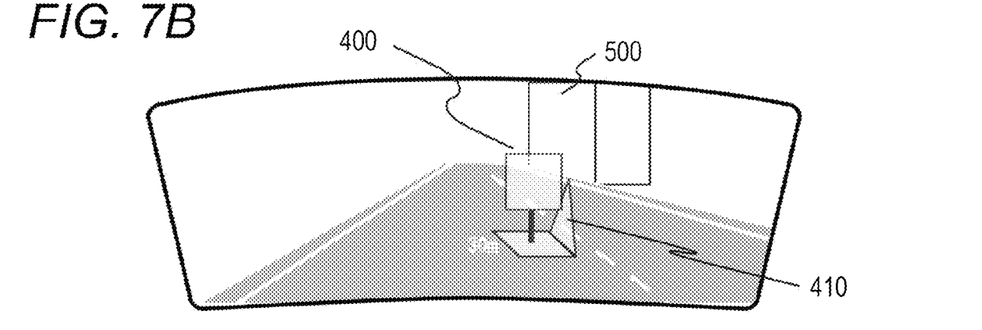
Figure 7C:
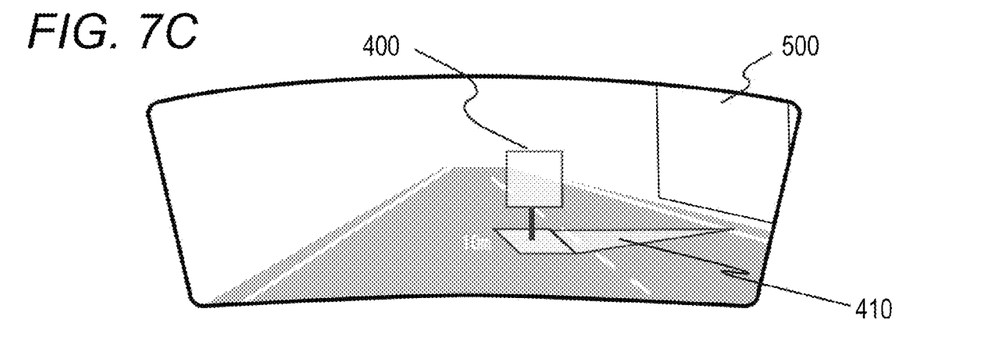
Figure 7D:
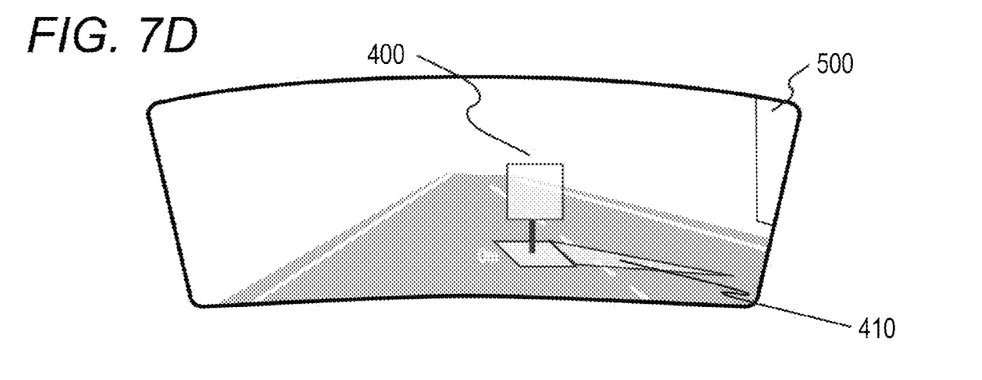

In addition, the display position in the left-right direction of the facility FIG. 400 in the above embodiment may be a position outside the traveling lane as illustrated in FIG. 6C. That is, in this case, for example, if the target facility is positioned on the right side of the traveling road, the position in the left-right direction of the display position DP of the center position G of the base FIG. 401 is set to a position overlapping with a virtual line VL as viewed from the driver when the virtual line VL which is on the right side separated, by a predetermined distance, from a white line on the right side of the traveling lane actually exists. Similarly, if the target facility is positioned on the left side of the traveling road, the position in the left-right direction of the display position DP of the center position G of the base FIG. 401 is set to a position overlapping with a virtual line as viewed from the driver when the virtual line which is on the left side separated, by a predetermined distance, from a white line on the left side of the traveling lane actually exists.

Further, some implementations may be configured such that the display position of the facility FIG. 400 is fixed at a position overlapping with a position relatively close to the driver on the road surface on the front side, the display size of the facility FIG. 400 is fixed, and only the shape of the facility direction indicating FIG. 410 is changed along with the approach to the facility so as to extend from the base FIG. 401 toward the facility 500 as illustrated in FIGS. 7A, 7B, 7C, and 7D.

Even in this case, the facility FIG. 400 is displayed to be viewable at a position on the near side of the position of the facility when the distance to the facility is far, and thus, the display is not unnatural even if the facility FIG. 400 is displayed in a size larger than a size in the case of displaying the facility FIG. 400 at the position of the facility. Further, it is possible to display the facility FIG. 400 even before the facility is included in the field of view. Accordingly, it is possible to prolong a period during which the facility FIG. 400 can be displayed with a size that is well viewable to the user.

It is intended that the foregoing detailed description be regarded as illustrative rather than limiting, and that it be understood that it is the following claims, including all equivalents, that are intended to define the spirit and scope of this disclosure.

What is claimed is:

1. An in-vehicle system that displays a facility figure, which is a figure representing a facility using a heads-up display projecting an image such that a virtual image is displayed on a front side of a front windshield of an automobile with respect to a user aboard the automobile, the in-vehicle system comprising:
   memory; and
   a processor in communication with the memory, the processor configured to execute instructions in the memory and to:
      control a display of the facility figure representing the facility using the heads-up display from a target facility distance, which is a distance from the automobile to the facility for which the facility figure is displayed positioned on a front side in a progressing direction of the automobile of a road on which the automobile is traveling becomes equal to or less than a first predetermined distance, until the target facility distance becomes a second predetermined distance smaller than the first predetermined distance,
      wherein the processor is configured to use, as a display area, an area in up-down and left-right directions, which overlaps with an area that allows the heads-up display to display the virtual image as viewed from the user to set a display position of a facility figure using the heads-up display such that the facility figure moves along a road on a road surface of the road on which the automobile is traveling as viewed from the user while a position in the display area overlapping with the facility figure as viewed from the user is changed from a position at which a height in the display area becomes a predetermined first height to a position at which the height becomes a predetermined second height, lower than the first height, as the target facility distance changes from the first predetermined distance to the second predetermined distance, and causes the heads-up display to display a facility indicating figure, which is a figure extending from the facility figure to the facility as viewed from the user during a period in which the facility figure is displayed, and
      wherein the position in the display area at which the height in the display area becomes the predetermined first height is a position below a point facing the facility on the road surface of the traveling road as viewed from the user when the target facility distance is the first predetermined distance.

2. The in-vehicle system according to claim 1, wherein the processor is further configured to:
   set the display position of the facility figure using the heads-up display to a position overlapping with a virtual line as viewed from the user when the virtual line parallel to a lane on which the automobile is traveling is present on the road surface of the traveling road regarding a position in the left-right direction, and
   set the display position of the facility figure using the heads-up display such that the position in the display area overlapping with the facility figure as viewed from the user becomes a position at the first height when the target facility distance is the first predetermined distance, becomes a position at the second height when the target facility distance is the second predetermined distance, and gradually changes from the position at the first height to the position at the second height as the target facility distance decreases from the first predetermined distance to the second predetermined distance regarding a position in the up-down direction.

3. The in-vehicle system according to claim 2, wherein the virtual line corresponds to either a virtual line that is parallel to a lane on which the automobile is traveling and passes through an inside of the lane or a virtual line that is parallel to the lane on which the automobile is traveling and passes through an outside of the lane.

4. The in-vehicle system according to claim 1, wherein the display control unit sets a display size of a facility figure using the heads-up display to increase as a distance between a facility for which the facility figure is displayed and the automobile changes from the first predetermined distance to the second predetermined distance.

5. The in-vehicle system according to claim 1, wherein the second predetermined distance is a distance from the automobile to the facility when the automobile reaches the facility.

6. The in-vehicle system according to claim 1, wherein the facility figure is a figure representing a state where a mark representing a type of the facility is supported in an upright state by a pole erected on a base, and the facility indicating figure is a figure extending from a portion representing the base of the facility figure toward the facility as viewed from the user.

7. The in-vehicle system according to claim 1, wherein the facility figure is a figure representing an inclination state of a mark representing a type of the facility.

8. An in-vehicle system that displays a facility figure, which is a figure representing a facility using a heads-up display projecting an image such that a virtual image is displayed on a front side of a front windshield of an automobile with respect to a user aboard the automobile, the in-vehicle system comprising:

memory; and a processor in communication with the memory, the processor configured to execute instructions stored in the memory and to:

control a display of the facility figure representing the facility using the heads-up display from a target facility distance, which is a distance from the automobile to the facility for which the facility figure is displayed positioned on a front side in a progressing direction of the automobile of a road on which the automobile is traveling becomes equal to or less than a first predetermined distance until the target facility distance becomes a second predetermined distance smaller than the first predetermined distance, wherein the processor uses, as a display area, an area in up-down and left-right directions, which overlaps with an area that allows the heads-up display to display the virtual image as viewed from the user to set a display position of a facility figure using the heads-up display such that the facility figure is at a position overlapping with a position on a road surface of the road on which the automobile is traveling as viewed from the user and a position in the display area overlapping with the facility figure as viewed from the user has a height in the display area being a predetermined height, and causes the heads-up display to display a facility indicating figure, which is a figure extending from the facility figure to the facility as viewed from the user during a period in which the facility figure is displayed, and wherein the position in the display area that has the height in the display area being the predetermined height is a position below a point facing the facility on the road surface of the traveling road as viewed from the user when the target facility distance is the first predetermined distance.

9. The in-vehicle system according to claim 1, wherein the second predetermined distance is a distance from the automobile to the facility when the automobile reaches the facility.

10. The in-vehicle system according to claim 1, wherein the facility figure is a figure representing a state where a mark representing a type of the facility is supported in an upright state by a pole erected on a base, and the facility indicating figure is a figure extending from a portion representing the base of the facility figure toward the facility as viewed from the user.

11. The in-vehicle system according to claim 1, wherein the facility figure is a figure representing an inclination state of a mark representing a type of the facility.

\* \* \* \* \*